April 18, 1944.        W. P. COUSINO        2,347,085
MOTOR VEHICLE LIGHTING
Filed Oct. 10, 1941        2 Sheets-Sheet 1
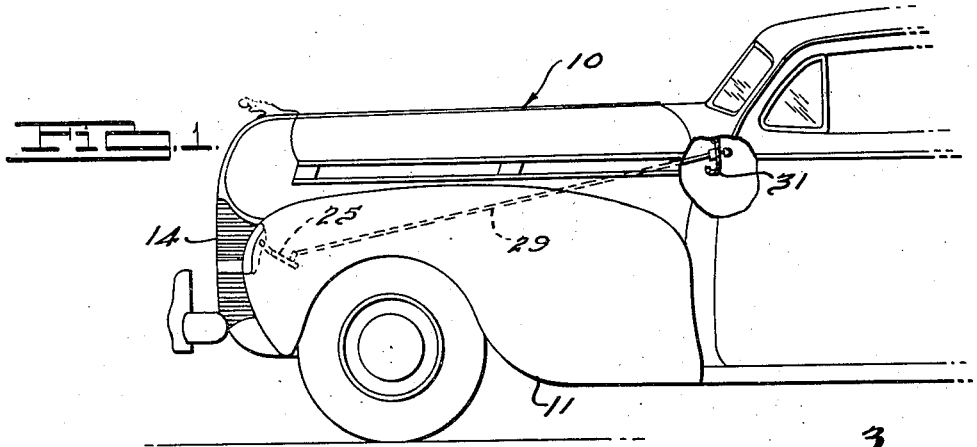
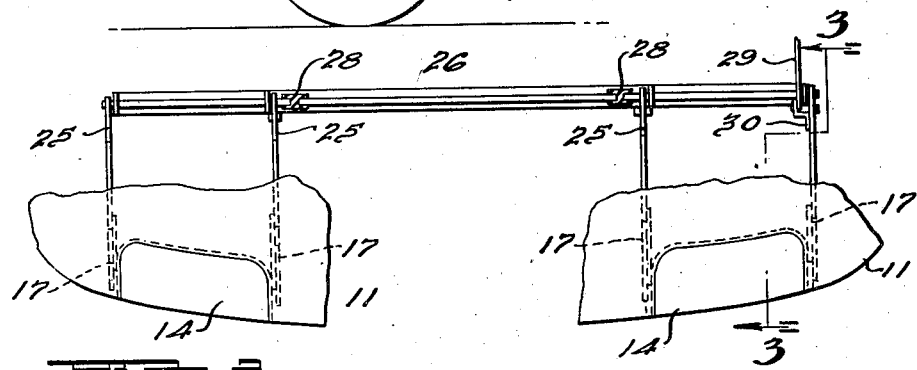
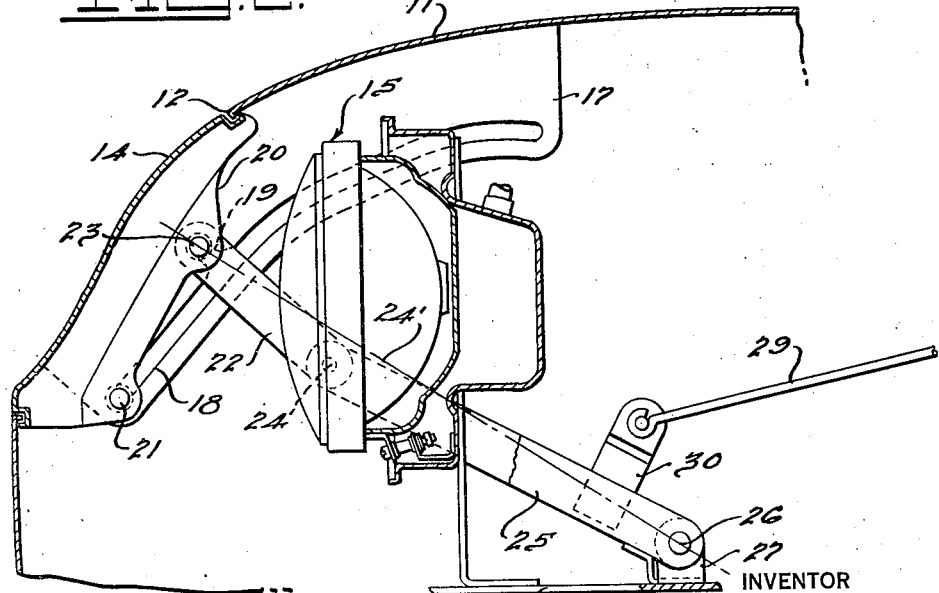
INVENTOR
Walter P. Cousino
BY
Harness, Dickey, Pierce & Harris
ATTORNEYS.

April 18, 1944. W. P. COUSINO 2,347,085
MOTOR VEHICLE LIGHTING
Filed Oct. 10, 1941 2 Sheets-Sheet 2
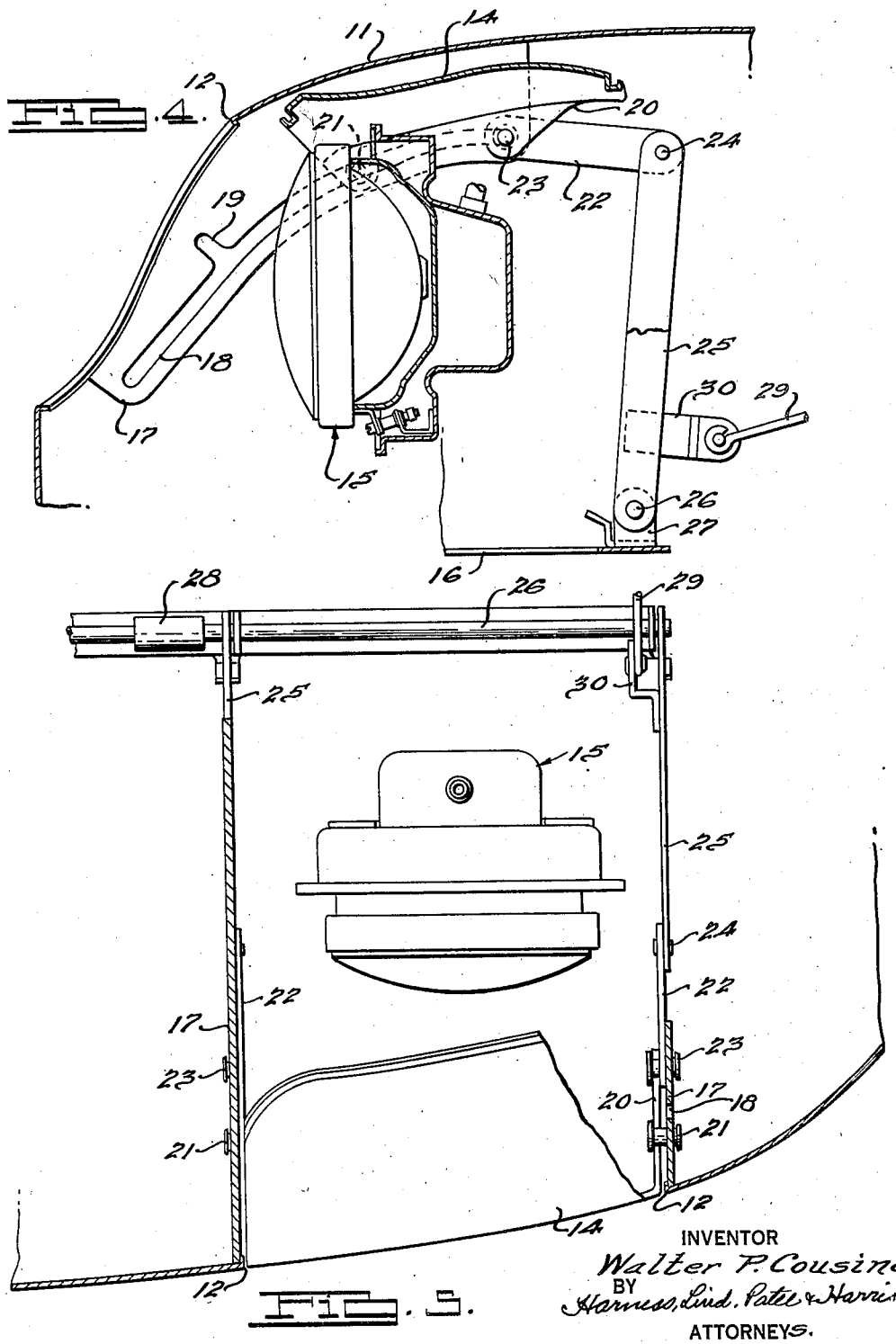
INVENTOR
Walter P. Cousino.
BY Harness, Dind, Patel & Harris
ATTORNEYS.

Patented Apr. 18, 1944

2,347,085

UNITED STATES PATENT OFFICE 2,347,085

MOTOR VEHICLE LIGHTING

Walter P. Cousino, Detroit, Mich., assignor to Chrysler Corporation, Highland Park, Mich., a corporation of Delaware Application October 10, 1941, Serial No. 414,425

6 Claims. (Cl. 240—7.1)

This invention relates to motor vehicles and more particularly to headlamp structures therefor.

An object of the invention is to provide a motor vehicle having a frontal surface provided with laterally spaced openings behind each of which is disposed a headlamp together with a closure for each of the openings movable to mask and unmask the lamp, the closures preferably completing the surface continuity of that portion of the vehicle having the openings, and improved means for operating the closures.

More particularly, an object of the invention is the provision of improved means for supporting a closure for movement in a path as aforesaid and accommodating movement of at least a portion of the closure in a direction transverse to said path as an incident to movement thereof between its masking and unmasking positions.

Another object of the invention is the provision of means for guiding movement of such closure as aforesaid.

A still further object of the invention is the provision of improved means for actuating a closure mounted for movement as aforesaid.

Other objects and advantages of the invention will be more apparent from the following description, taken in connection with the accompanying drawings, in which:

Fig. 1 is a fragmentary side elevational view of a motor vehicle embodying the invention.

Fig. 2 is a top plan view, parts being broken away and in section, illustrating the closures and the operating means therefor.

Fig. 3 is a fragmentary side elevational view, partly in section, taken as indicated by the line 3—3 of Fig. 2.

Fig. 4 is a view similar to Fig. 3 but showing the movable parts in another position.

Fig. 5 is an enlarged fragmentary top plan view illustrating a typical closure and the mounting therefor.

Referring to the drawings, the numeral 10 designates a motor vehicle having a pair of front fenders 11 each of which has an opening 12 in the frontal surface thereof provided with a movable closure 14 which, when in closed position, completes the surface continuity of the fender. Disposed rearwardly of each opening 12 is a headlamp structure 15 fixedly secured to a support 16. Each closure 14 is adapted to be moved from a masking position with respect to the associated lamp, as shown in Fig. 3, to an unmasking position with respect thereto as shown in Fig. 4.

Each closure 14 is supported for movement as aforesaid by a pair of plates 17 secured to the fender 11 at respectively opposite sides of the opening 12 and extending rearwardly therefrom. Each plate 17 has generally arcuately extending slot 18 and a relatively short intersecting slot 19, as shown more particularly in Figs. 3 and 4. Side walls 20 extend rearwardly from the frontal surface of each closure 14, each side wall 20 carrying a pin 21 extending through the slot 18 in the adjacent plate 17. An operating link 22 is pivotally secured to each side wall 20 by a pin 23 which is disposed in the slot 19 of the adjacent plate 17 when the closure is in its Fig. 3 position.

Each link 22 has pivotally connected thereto at 24 a second link 25 non-rotatably secured to a rod member 26 extending transversely of the vehicle and rotatably secured to the support 16 by uprights 27, the member 26 preferably including a plurality of rods having adjacent ends operatively connected by a body of rubber-like material 28, all as shown more particularly in Fig. 2. When the closures are positioned as shown in Figs. 1, 2, 3 and 5, the axis of pivot at the connection 24 is disposed in laterally spaced relation to a line 24' connecting the pivot centers for the opposite ends of the links 22 and 25, as shown in Fig. 3.

The operating linkage provided by the link members 22 and 25 are adapted for simultaneous operation by a rod 29 having one end thereof secured to a bracket 30 carried by one of the link members 25, the other end of the rod 29 extending through the body dash 31.

In moving the closures 14 from the Fig. 3 position to the Fig. 4 position, the rod 29 is pulled to rotate the operating linkage, comprising the links 22—25, in a clockwise direction as viewed in Fig. 3, and during the initial portion of the movement of the connection at 24 beyond the line 24' each closure is swung in a clockwise direction about its connection with the plates 17 provided by the pins 21, the pin 23 moving from the auxiliary or relatively short slot 19 into the main slot 18. This initial movement of the closures serves to break any seal which may have been formed by ice or sleet between the associated fender and closure. Further rotation of the linkage, after the pin 23 has moved into the slot 18, serves to pull the closures in the path defined by the slots 18 to the unmasking position, above the lamp, as shown in Fig. 4. The closures are returned to the Fig. 3 position by pushing the rod 29 to effect anti-clockwise rotation of the linkage, the pin 23 registering with the slot 19 as the point 24 approaches the line 24' in order to be pushed therein, each closure being swung in an anti-clockwise direction about its connection with the associated supporting plates 17.

Although but one specific embodiment of the invention has herein been shown and described, it will be understood that various changes in the size, shape and arrangement of parts may be made without departing from the spirit of the invention or from the scope of the appended claims.

I claim:

1. In a motor vehicle having a frontal surface provided with an opening, a lamp registering with said opening, a closure for said opening movable between the lamp and opening to mask and unmask the lamp with respect to the opening, a support for said closure including a main guideway and an auxiliary guideway intersecting the latter, a first guide part secured to said closure and movable in and longitudinally with respect to said main guideway for guiding movement of said closure in a path between masking and unmasking positions as aforesaid and accommodating swinging of the closure about an axis as an incident to movement thereof in said path, toggle linkage for moving said closure, and a second guide part secured to said closure and movable from one of said guideways to the other thereof to accommodate said swinging movement of said closure, said second guide part being movable in said main guideway during movement of said closure in said path.

2. In a motor vehicle having a frontal surface provided with an opening, a lamp registering with said opening, a closure for said opening movable between the lamp and opening to mask and unmask the lamp with respect to the opening, a support for said closure including a main guideway adapted to guide movement of the closure in a path between masking and unmasking positions and an intersecting auxiliary guideway adapted to guide movement of the closure in a direction generally transversely to said path, a first means securing the closure to said support for movement in said transverse direction and movable in and longitudinally with respect to said main guideway to accommodate movement of the closure in said path, a second means movable with said closure disposed in said auxiliary guideway when said closure is in its masking position and being movable therefrom into said main guideway to accommodate movement of the closure in said direction, said second means being movable in said main guideway during movement of the closure in said path, and actuating means for moving said closure as aforesaid.

3. In a motor vehicle having a frontal surface provided with an opening, a lamp registering with the opening, a closure for said opening movable between the lamp and opening to mask and unmask the lamp with respect to the opening, a support for said closure including a main guideway adapted to guide movement of the closure in a path between masking and unmasking positions and an intersecting auxiliary guideway adapted to guide movement of the closure in a direction generally transversely to said path, a first means securing the closure to said support for movement in said transverse direction and being movable in said main guideway to accommodate movement of the closure in said path, a second means movable with said closure disposed in said auxiliary guideway when said closure is in its masking position and being movable therefrom into said main guideway to accommodate movement of the closure in said direction, said second means being movable in said main guideway during movement of the closure in said path, and actuating means for moving said closure as aforesaid, a support for said actuating means, said actuating means including a pair of pivotally connected arms respectively pivotally attached to the closure and to said actuating support, the pivotal connection between said arms being disposed in laterally spaced relation to a line extending between the points of pivotal attachment of said arms as aforesaid when the closure is in its masking position.

4. In a motor vehicle having a frontal surface provided with an opening, a lamp registering with the opening, a closure for said opening movable between the lamp and opening to mask and unmask the lamp with respect to the opening, support means for said closure including a fixed supporting member having a main guideway adapted to accommodate movement of the closure in an arcuate path between masking and unmasking positions and an auxiliary guideway adapted to accommodate movement of at least a portion of the closure in a direction transverse to said path, a pin carried by the closure disposed in said main guideway for rotation relative thereto to accommodate movement of the closure in said direction, said pin being movable in and longitudinally with respect to said main guideway to accommodate movement of said closure in said path, a second pin movable with the closure disposed in said auxiliary guideway when the closure is in its masking position and movable into said main guideway during movement of the closure in said direction, and an operating linkage secured to said closure for moving the latter as aforesaid.

5. In a motor vehicle having a frontal surface provided with an opening, a lamp disposed rearwardly of and in registering relation with said opening, a closure member for the opening adapted for movement between positions to respectively mask and unmask the lamp and for movement between said masking position and a retracted position with respect to the opening, mounting means for said closure member including a relatively fixed member, one of said members having a guideway fixed relative thereto, a guide part disposed in said guideway and forming a pivotal connection between said members to thereby accommodate swinging movement of said closure member relative to said support member generally transversely of said guideway between said masking and retracted positions, and means for moving said closure member about a second axis spaced from the axis of said pivotal connection for movement of the closure member between its retracted and unmasking positions, said guide part being movable in and longitudinally with respect to said guideway during movement of the closure member between its retracted and unmasking positions.

6. In a motor vehicle having a frontal surface provided with an opening, a lamp registering with the opening, a closure member having a face disposed in said opening and masking said lamp, a stationary support member for said closure member, one of said members having a guideway carried thereby and the other of said members having a pivot forming element extending into said guideway connecting said closure member with said support member for swinging movement relative thereto to a position whereby at least a portion of said face is retracted from said opening, said element being movable in and longitudinally with respect to said guideway to accommodate movement of the closure from said position to a second position whereby said face is disposed in unmasking relation with respect to said lamp, and operating means for said closure member including a pair of pivotally connected arms and a support therefor, one of said arms being pivotally attached to said closure member and the other thereof pivotally attached to said support, the pivotal connection between said arms being disposed in laterally spaced relation to a line extending directly between the points of pivotal attachment of said arms as aforesaid when the closure is in its masking position whereby to swing said closure member, as aforesaid.

WALTER P. COUSINO.